United States Patent
Inaba et al.

(10) Patent No.: US 9,302,398 B2
(45) Date of Patent: Apr. 5, 2016

(54) ROBOT SYSTEM FOR DETERMINING OPERATOR BY BIOMETRIC AUTHENTICATION

(71) Applicant: FANUC Corporation, Yamanashi (JP)

(72) Inventors: Ryoutarou Inaba, Yamanashi (JP); Tomoki Oya, Yamanashi (JP)

(73) Assignee: FANUC CORPORATION, YAMANASHI (JP)

( * ) Notice: Subject to any disclaimer, the term of this patent is extended or adjusted under 35 U.S.C. 154(b) by 0 days.

(21) Appl. No.: 14/639,209

(22) Filed: Mar. 5, 2015

(65) Prior Publication Data
US 2015/0273704 A1    Oct. 1, 2015

(30) Foreign Application Priority Data
Mar. 28, 2014  (JP) .................................. 2014-070116

(51) Int. Cl.
| | |
|---|---|
| *G05B 19/00* | (2006.01) |
| *B25J 19/06* | (2006.01) |
| *B25J 9/16* | (2006.01) |
| *B25J 13/06* | (2006.01) |

(52) U.S. Cl.
CPC *B25J 19/06* (2013.01); *B25J 9/161* (2013.01); *B25J 13/06* (2013.01)

(58) Field of Classification Search
CPC ........... B25J 19/06; B25J 9/161; B25J 913/09
USPC ........................................................ 700/264
See application file for complete search history.

(56) References Cited

U.S. PATENT DOCUMENTS

| | | | | |
|---|---|---|---|---|
| 2015/0273704 A1* | 10/2015 | Inaba | ...................... | B25J 9/161 700/264 |
| 2015/0324692 A1* | 11/2015 | Ritchey | .................... | G06N 3/08 348/14.08 |
| 2015/0332606 A1* | 11/2015 | Orosco | .............. | G09B 19/0038 434/247 |

FOREIGN PATENT DOCUMENTS

| | | |
|---|---|---|
| EP | 2151726 A2 | 2/2010 |
| JP | 11-262059 A | 9/1999 |
| JP | 2000-3337 A | 1/2000 |
| JP | 2001-88069 A | 4/2001 |
| JP | 2003-1347 A | 1/2003 |
| JP | 2004-243472 A | 9/2004 |
| JP | 2007-249466 A | 9/2007 |
| JP | 2008-221363 A | 9/2008 |
| JP | 2011-224777 A | 11/2011 |

* cited by examiner

*Primary Examiner* — Ian Jen
(74) *Attorney, Agent, or Firm* — Hauptman Ham, LLP (57) ABSTRACT

In a robot system according to the present invention, an operation panel includes a biometric information acquisition unit configured to acquire biometric information of an operator who uses the operation panel. The robot system includes a biometric information storage unit configured to store biometric information of a plurality of operators, an operator determination unit configured to determine an operator who uses the operation panel by matching the biometric information acquired by the biometric information acquisition unit with the biometric information stored by the biometric information storage unit when the operation panel is activated or when a predetermined operation is executed for the operation panel, and a limitation unit configured to individually limit executable functions for the operator determined by the operator determination unit.

12 Claims, 7 Drawing Sheets

| NAME OF OPERATOR | FACIAL INFORMATION | EXECUTABLE FUNCTION ||||
|---|---|---|---|---|---|
| | | EDITING OF SYSTEM VARIABLE | EDITING OF PROGRAM | CYCLE START | EMERGENCY STOP |
| A | a | YES | YES | YES | YES |
| B | b | NO | YES | YES | YES |
| C | c | NO | NO | YES | YES |
| D | d | NO | NO | NO | YES |

FIG. 3B

| NAME OF FUNCTION | OPERATOR PERMITTED TO EXECUTE |
|---|---|
| EDITING OF SYSTEM VARIABLE | A |
| EDITING OF PROGRAM | A, B |
| CYCLE START | A, B, C |
| EMERGENCY STOP | A, B, C, D |

| NAME OF OPERATOR | FACIAL INFORMATION |
|---|---|
| A | a |
| B | b |
| C | c |
| D | d |

FIG. 6

FIG. 8 ical Field

ROBOT SYSTEM FOR DETERMINING OPERATOR BY BIOMETRIC AUTHENTICATION

RELATED APPLICATIONS

The present application claims priority to Japanese Application Number 2014-070116, filed Mar. 28, 2014, the disclosure of which is hereby incorporated by reference herein in its entirety.

BACKGROUND OF THE INVENTION

1. Technical Field

The present invention relates to a robot system having a function of determining an operator.

2. Description of the Related Art

A series of operations for operating an industrial robot includes an operation such as teaching the robot, which is carried out by an operator within a movable range of the robot. International Standard ISO 10218-2 defining safety standards concerning handling of industrial robots stipulates that only skilled experts should be permitted to carry out maintenance work of the robot. Thus, some operations necessary for operating the industrial robot should not be carried out by unskilled operators in order to prevent serious accidents.

A known robot system is provided with means for limiting functions according to the degree of operator's skill. For example, a magnetic card or a universal serial bus (USB) terminal recording operator's identification information, or a personal identification method using a password has been used. JP 2008-221363 A discloses a robot control system configured to read operator information stored in a radio-frequency identification device (RFID) tag carried by an operator by a RFID tag reader of a teaching pendant. EP 2151726 A discloses a technology for determining an operator by using a memory card, an integrated circuit (IC) card, a USB memory, or a transponder.

However, when the identification card or terminal is lent to others or lost, or when the password is leaked, safety may not be ensured. In addition, once an authorized operator unlocks the restriction, any operator, including unauthorized ones, can then operate the robot to carry out the restricted process.

In recent years, biometric authentication has been introduced as a personal identification method. Use of the biometric information can eliminate a possibility of a loss of the terminal used for the authentication and leakage of information necessary for the authentication. For example, JP 2007-249466 A discloses a controller configured to restrict operator's use of a device based on an image captured by an imaging device. However, the technology disclosed in JP 2007-249466 A is mainly designed to identify those having access rights to personal information and those having no access right in order to protect the personal information, and thus has no relevance to an accident prevention technology when the robot is operated.

Therefore, there is a demand for a robot system capable of ensuring safety by accurately determining an operator who works around a robot.

SUMMARY OF THE INVENTION

According to a first aspect of the present invention, there is provided a robot system comprising: a robot configured to execute an operation according to a manual operation or a control program; a controller configured to control the robot; a portable operation panel configured to transmit to or receive from the controller signals and data, the operation panel comprising a biometric information acquisition unit configured to acquire biometric information of an operator who uses the operation panel, the robot system further comprising: a biometric information storage unit configured to store biometric information of a plurality of operators; an operator determination unit configured to determine, when the operation panel is activated or when a predetermined operation is executed for the operation panel, the operator who uses the operation panel by matching the biometric information acquired by the biometric information acquisition unit with the biometric information stored by the biometric information storage unit; and a limitation unit configured to individually limit executable functions for the operator determined by the operator determination unit.

According to a second aspect of the present invention, in the robot system according to the first aspect, the operation panel is configured to be switched between a valid state where an operation using the operation panel is validated and an invalid state where an operation using the operation panel is invalidated, and the operator determination unit is configured not to execute an operator determination process when the operation panel is in the invalid state.

According to a third aspect of the present invention, in the robot system according to the first or second aspect, the operator determination unit is configured to request the operator determination process to be executed at every predetermined time.

According to a fourth aspect of the present invention, in the robot system according to any one of the first to third aspects, the operator determination unit is configured not to execute a next operator determination process until a predetermined time period elapses after execution of the operator determination process.

According to a fifth aspect of the present invention, in the robot system according to any one of the first to fourth aspects, until a predetermined time period elapses after execution of the operator determination process, even when acquisition of the biometric information of the operator fails in the operator determination process, a limitation on functions based on a result of a determination process which is successfully carried out immediately before is maintained.

According to a sixth aspect of the present invention, in the robot system according to any one of the third to fifth aspects, the operation panel is configured to be switched between a valid state where an operation using the operation panel is validated and an invalid state where an operation using the operation panel is invalidated, and a length of the predetermined time varies depending on whether the operational panel is in the valid state or the invalid state.

According to a seventh aspect of the present invention, in the robot system according to any one of the first to sixth aspects further comprises: an accident information storage unit configured to store accident information associated with each operator; and an accident information display unit configured to display accident information associated with the operator determined by the operator determination unit.

According to an eighth aspect of the present invention, in the robot system according to any one of the first to seventh aspects, the operator determination unit is configured to determine whether or not a current operator is identical to an operator immediately before based on biometric information of the operator determined immediately before and biometric information of the current operator, and the limitation unit is configured to maintain a limit on the operator immediately before when it is determined that the current operator is identical to the operator immediately before.

According to a ninth aspect of the present invention, in the robot system according to any one of the first to eighth aspects, the biometric information of the plurality of operators is stored in association with functions executable by each of the plurality of operators.

According to a tenth aspect of the present invention, in the robot system according to any one of the first to eighth aspects, each function of the operation panel is stored in association with biometric information of an operator capable of executing the function.

These and other objects, features, and advantages of the present invention will become more apparent from the following detailed description of the exemplary embodiments of the present invention taken in connection with the accompanying drawings.

DETAILED DESCRIPTION OF THE INVENTION

Hereinafter, the embodiments of the present invention will be described with reference to the accompanying drawings. The sizes of illustrated constituent elements of the embodiments in relation to one another may be modified as necessary for better understanding of the present invention. For the same or corresponding components, the same reference signs are used throughout the plurality of drawings.

Figure 1:
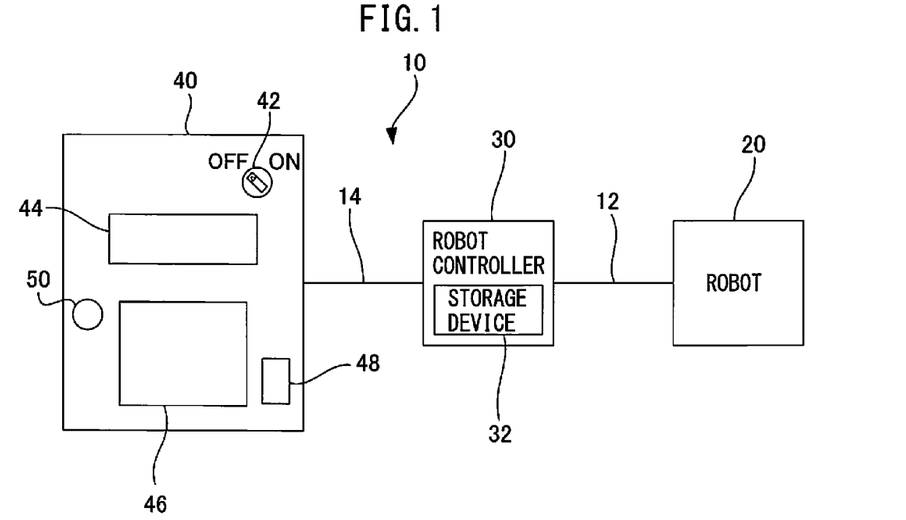
FIG. 1 is a schematic diagram illustrating an overall configuration of a robot system according to one embodiment.

FIG. 1 is a schematic diagram illustrating' an overall configuration of a robot system 10 according to one embodiment. The robot system 10 includes a robot 20, a robot controller 30 connected to the robot 20 via a communication cable 12 to control the robot 20, and an operation panel 40 connected to the robot controller 30 via a communication cable 14 to transmit a signal or data to or receive a signal or data from the robot controller 30. In FIG. 1, the robot controller 30 and the operation panel 40 are connected via the communication cable 14. However, they may be configured to communicate with each other wirelessly.

The robot 20 is a multiple-joint robot used for various purposes such as conveying and processing of a workpiece (not illustrated). Each joint of the robot 20 is driven by a not-illustrated servo motor. Each servo motor is controlled by the robot controller 30 in response to an operation of the operation panel 40 or in accordance with a predetermined control program.

The robot controller 30 has a hardware configuration that includes a central processing unit (CPU) for executing various calculations, a read-only memory (ROM) for storing a control program or the like, a random access memory (RAM) for temporarily storing the results of calculations by the CPU, a known input device such as a keyboard or a mouse, and a known display device such as a liquid crystal display. The robot controller 30 creates a control command for controlling the robot 20 based on the control program, setting values input from the outside via the input device, or data transmitted from the operation panel 40. In addition, the robot controller 30 includes a storage device 32 for storing biometric information or the like used for determining an operator as described in detail below. Alternatively, the storage device 32 may be incorporated into a device communicable with the robot controller 30, such as the operation panel 40.

The operation panel 40 is a lightweight and thin device such as a teaching pendant, which is designed so as to be easily carried by the operator. By using the operation panel 40, the operator can carry out various operations such as selection and execution of the control program for the robot 20, viewing and changing of various types of parameters, and teaching to the robot 20.

The operation panel 40 according to the illustrated embodiment includes an ON/OFF switch 42, a display unit 44, a key input unit 46, an enable switch 48, and a biometric information acquisition device 50. In FIG. 1, the operation panel 40 is schematically illustrated, and those skilled in the art can change the arrangement of the components as necessary, and appreciate that some of the components can be omitted.

The ON/OFF switch 42 is a switch configured to enable the operator to manually switch between a valid state where various types of functions of the operation panel 40 are validated and an invalid state where the functions are invalidated. Accordingly, the operator can operate the ON/OFF switch 42 to prevent an erroneous operation as necessary, for example, when an operation is temporarily interrupted or the like.

The display unit 44 is, for example, a liquid crystal display. The display unit 44 displays a menu screen for selecting a function, a setting screen for viewing a setting content, or an editing screen for editing the setting content. The key input unit 46 is used for selecting an item to be displayed on the display unit 44 or inputting a numerical value or a symbol as necessary for the purpose of editing. Alternatively, the operation panel 40 may include a touchscreen where the display unit 44 and the key input unit 46 are integrated.

The enable switch 48 is a safety switch pressed by the operator when certain types of operations particularly necessary to prevent an erroneous operation from being executed. For example, according to the International Standard ISO 10218-1, safety measures must be provided for teaching of the robot to inhibit an operation of the robot unless the enable switch is pressed. The operation panel 40 may also be configured to request pressing of the enable switch 48 in order to edit the program. By requesting pressing of the enable switch 48 in order to carry out certain operations, an erroneous operation that may lead to a serious accident can be prevented.

The biometric information acquisition device 50 has a function of acquiring biometric information of the operator who uses the operation panel 40. The biometric information acquisition device 50 is, for example, a camera having a face recognition function of recognizing and capturing an image of an operator's face, or a fingerprint detector. When a fingerprint is used as biometric information, for example, a fingerprint detection function may be provided to the key input unit 46.

For example, when teaching of the robot 20 is carried out by using the operation panel 40, the operator sometimes need to work within a movable area of the robot 20. Thus, in the robot system 10 according to the embodiment, the biometric information of the operator acquired by the biometric information acquisition device 50 and the biometric information of a plurality of operators stored in the storage device 32 of the robot controller 30 are matched with each other in order to determine the operator. Executable functions are allocated to the respective operators according to predetermined criteria such as the degrees of skill.

Figure 2:
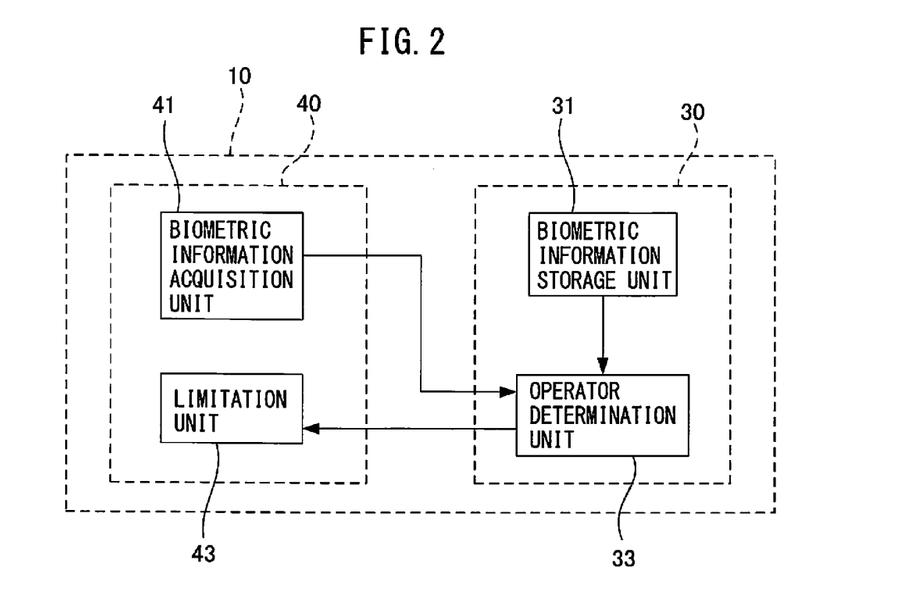
FIG. 2 is a functional block diagram of a robot system according to one embodiment.

FIG. 2 is a functional block diagram of the robot system 10 according to the embodiment. As illustrated, the operation panel 40 includes a biometric information acquisition unit 41 and a limitation unit 43. The robot controller 30 includes a biometric information storage unit 31 and an operator determination unit 33. The limitation unit 43, the biometric information storage unit 31 and the operator determination unit 33 may be incorporated into the operation panel 40 or the robot controller 30.

The biometric information acquisition unit 41 has a function of acquiring the biometric information of the operator by the biometric information acquisition device 50. The biometric information acquisition unit 41 is configured to activate the biometric information acquisition device 50, for example, when the operation panel 40 is activated or when a predetermined operation is executed for the operation panel 40, or when the enable switch is pressed. The biometric information of the operator acquired by the biometric information acquisition device 50 is output from the biometric information acquisition unit 41 to the operator determination unit 33.

The biometric information storage unit 31 has a function of storing the biometric information of each operator by the storage device 32. The biometric information of the operator is stored, for example, in association with the functions executable by the operator. Information stored in the storage device 32 is read out from the biometric information storage unit 31 by the operator determination unit 33.

The operator determination unit 33 has a function of determining a current operator using the operation panel by comparing the biometric information of the current operator output from the biometric information acquisition unit 41 with the biometric information of the operators read out from the biometric information storage unit 31. The information of the determined operator is output together with information on the executable function allocated to the operator from the operator determination unit 33 to the limitation unit 43.

The limitation unit 43 has a function of limiting functions which can be carried out by the current operator based on the information of the current operator output from the operator determination unit 33.

Figure 3A:
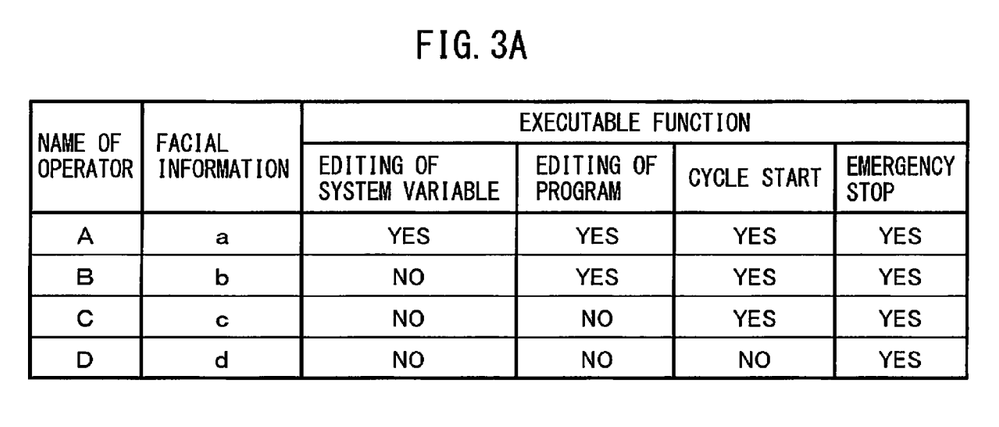
FIG. 3A is a table illustrating an example of information stored in a biometric information storage unit.
Figure 3B:
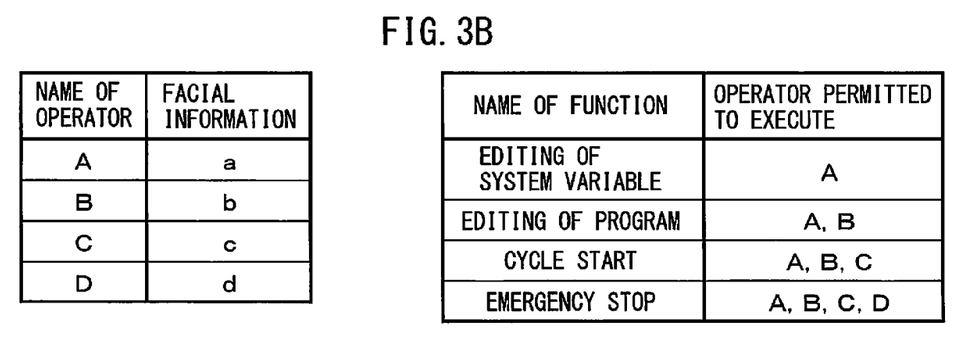
FIG. 3B is a table illustrating an example of information stored in the biometric information storage unit.

FIGS. 3A and 3B are tables each illustrating examples of information which may be stored in the biometric information storage unit 31. FIG. 3A illustrates an example where Operators A to D, respective pieces of face information a to d as biometric information and executable functions are stored in association with one another. In the illustrated example, Operator A who has a highest degree of skill can execute all functions including editing of system variables, program editing, a cycle start, and an emergency stop. Operators B and C who have less skill than that of Operator A are permitted to execute only some operations. Operator D who has a lowest degree of skill, and therefore a severest limitation applies, so as to allow him/her only emergency stopping of the system. In the example illustrated in FIG. 3B, a list of operators who are permitted to execute the respective functions are stored, as well as the respective pieces of face information a to d of Operators A to D are stored.

Figure 4:
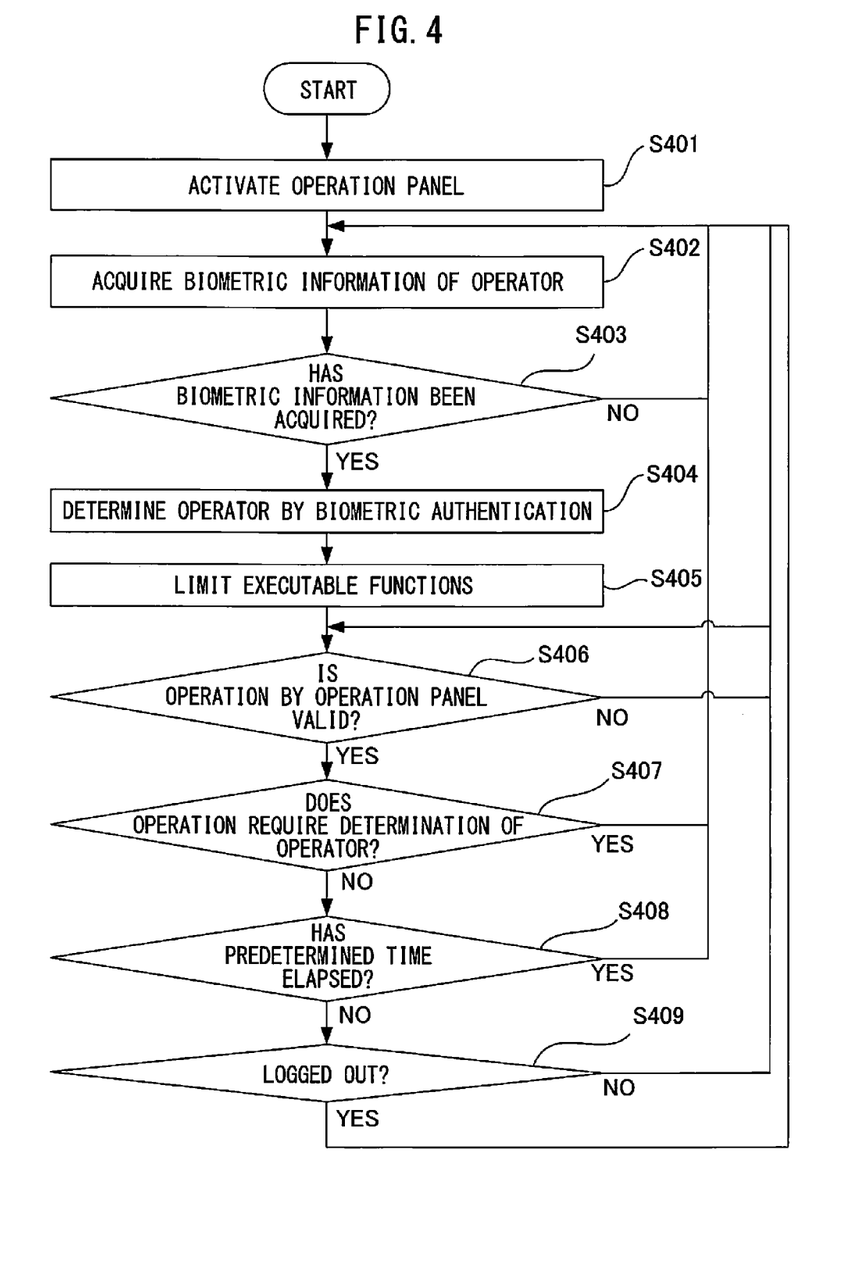
FIG. 4 is a flowchart illustrating a flow of a predetermined operation carried out by an operator using an operation panel in the robot system according to one embodiment.

FIG. 4 is a flowchart illustrating a flow of certain operations carried out by the operator using the operation panel 40 in the robot system 10 according to one embodiment. According to the embodiment, when the operator turns on the power for the operation panel 40 to activate the operation panel 40 at Step S401, execution of an operator determination process is requested. Accordingly, at Step S402, the biometric information of the operator is acquired by the biometric information acquisition unit 41 of the operation panel 40. At this time, for example, information of a content instructing a predetermined operation to the operator to provide the biometric information is displayed on the display unit 44. In response, for example, the operator directs his/her face to the camera or places a finger on the fingerprint detector so that the biometric information of the operator can be acquired.

At Step S403, it is determined as to whether or not the biometric information of the operator has been appropriately acquired. When it is determined that the biometric information has not been acquired ("NO" at Step S403), for example, when no face of the operator is captured by the camera, the process returns to Step S402 to repeat Steps S402 and S403 until the biometric information of the operator is acquired. Alternatively, when the biometric information cannot be acquired, an operation to the operation panel 40 may be inhibited.

When it is determined that the biometric information of the operator has been acquired ("YES" at Step S403), the process proceeds to Step S404 to execute a determination process of a current operator by the operator determination unit 33. At Step S405, executable functions are limited for the determined operator by the limitation unit 43. When the biometric information of the operator acquired at Step S402 does not match that of any operator stored in the biometric information storage unit 31, the operation panel 40 may be disabled.

At Step S406, it is determined as to whether or not the operation of the operation panel 40 is valid. When the operation of the operation panel 40 is invalid ("NO" at Step S406), for example, when the ON/OFF switch 42 is switched off by the operator, the respective functions of the operation panel 40 are invalid. In this case, for example, since the robot 20 does not operate even when the enable switch 48 is pressed, even erroneous pressing of the enable switch 48 will not result in any serious accident. This eliminates the necessity of limiting functions executed while pressing the enable switch 48 by the limitation unit 43. Thus, determination of the operator is not executed until the operation of the operation panel 40 is determined to be valid at Step S406.

When it is determined that the operation of the operation panel 40 is valid ("YES" at Step S406), the process proceeds to Step S407 to determine whether or not an operation for requesting execution of an operator determination process has been performed or not. When it is determined that the operation for requesting execution of an operator determination process has been performed ("YES" at Step S407), the process returns to Step S402 to execute the operator determination process again. The operation for requesting the execution of the operator determination process is, for example, a key operation for editing the program or teaching the robot which requires the enable switch 48 to be pressed. What operation requires the determination process can be changed as necessary in consideration of safety or work efficiency.

When safety is considered more important, more operations are designated as operations which require the determination process.

When it is determined that the operation for requesting execution of an operator determination process has not been performed ("NO" at Step S407), the process proceeds to Step S408. At Step S408, it is determined as to whether or not a predetermined time period has elapsed since the last operator determination process is executed. When it is determined that the predetermined time period has elapsed ("YES" at Step S408), the process returns to Step S402 to execute an operator determination process again. In this way, by executing the operator determination process at least after a predetermined time period has elapsed, an unauthorized operator can be prevented from executing the functions, even when the operator moves away from a work place after lifting the limit on the functions.

When it is determined that the predetermined time period has not elapsed ("NO" at Step S408), the process proceeds to Step S409 to determine as to whether or not the operator has logged out. When it is determined that the operator has not logged out ("NO" at Step S409), the process returns to Step S406 to repeat Steps S406 to S409.

The operator logs out when he/she stops using the operation panel 40 or when he/she finishes using the operation panel 40. Accordingly, when it is determined that the operator has logged out ("YES" at Step S409), the process returns to Step S402 to execute the operator determination process again.

The embodiment described above referring to FIG. 4 can provide the following effects.

(1) Since the operator is determined by using the biometric authentication, there is no risk of the information terminal being lost or lent to others, or the authentication information being leaked, unlike the conventional art.

(2) While the operation of the operation panel 40 is invalidated, the operator determination process is not carried out. This can prevent execution of any unnecessary determination process.

(3) When a predetermined time period elapses after the last determination process is executed, the determination process is forcibly carried out. Thus, even when the operator is switched during the operation, the operator can be prevented from mistakenly executing an operation which he/she is not allowed to do. In addition, when the operator moves away from the work place without logging out and a next operator is not around, no biometric information of the operator is acquired so that the operation panel is disabled. As a result, accidents caused by erroneous operations can be prevented.

Figure 5:
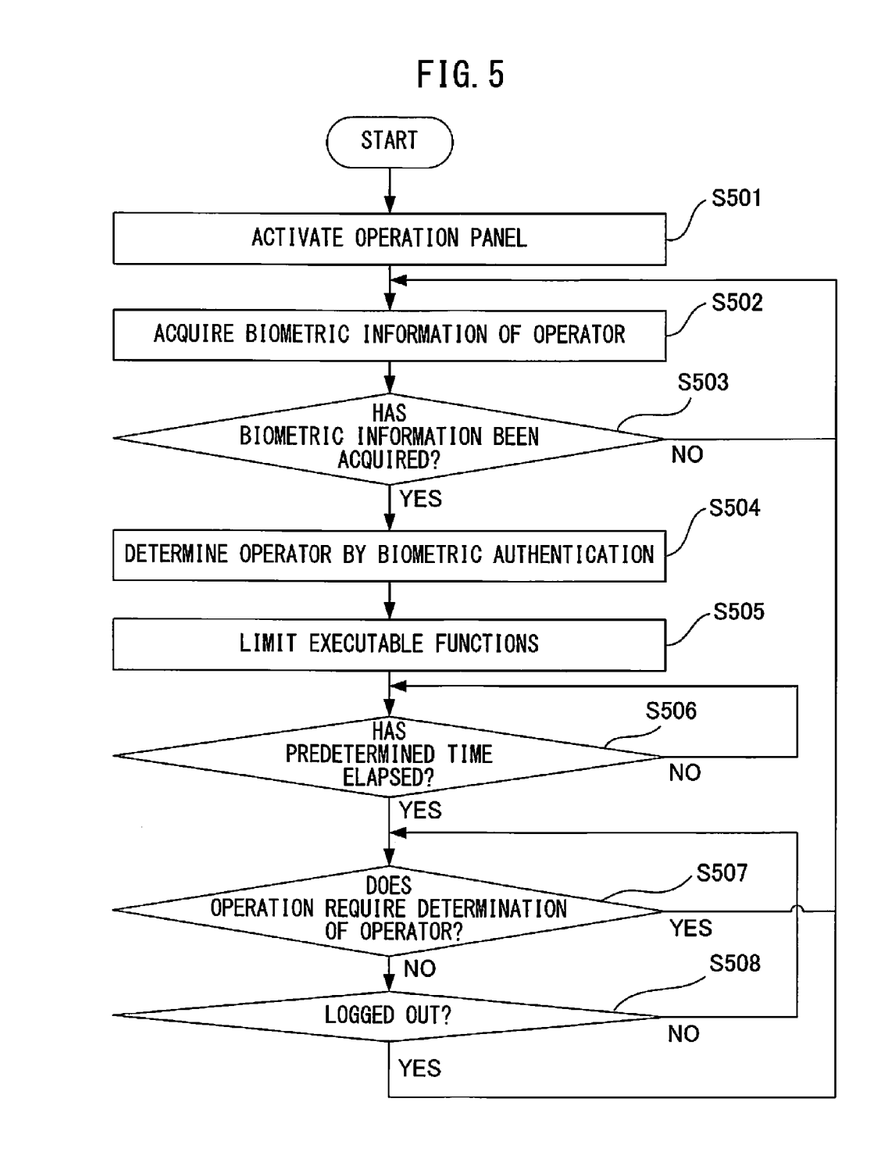
FIG. 5 is a flowchart illustrating a flow of a predetermined operation carried out by an operator using an operation panel in a robot system according to another embodiment.

FIG. 5 is a flowchart illustrating a flow of a certain operation carried out by an operator using an operation panel 40 in a robot system 10 according to another embodiment. In the embodiment, until a predetermined time period elapses after execution of an operator determination process, no determination process is carried out even when an operation which requires a determination process is executed. Processes of Steps S501 to S505 are similar to those of Steps S401 to S405 illustrated in FIG. 4, and thus an explanation thereof will be omitted.

At Step S506, it is determined whether or not a predetermined time period has elapsed since the last determination process is executed. The process does not proceed to a next step until the predetermined time elapses. When it is determined that the predetermined time has elapsed ("YES" at Step S506), the process proceeds to Step S507 to determine whether or not an operation requiring a determination process has been executed. When it is determined that the predetermined operation requiring a determination process has been executed ("YES" at Step S507), the process returns to Step S502 to execute a determination process by the operator determination unit 33.

When it is determined that the operation requiring the determination process has not been executed ("NO" at Step S507), the process proceeds to Step S508 to determine whether or not the operator has logged out. When it is determined that the operator has not logged out ("NO" at Step S508), or in other words, when it is determined that the operation panel 40 continues to be used, the process returns to Step S507. When it is determined that the operator has logged out ("YES" at Step S508), the process returns to Step S502 to execute the operator determination process again.

According to the embodiment, it is ensured that another determination process is not executed until the predetermined time elapses once the determination process is executed. This eliminates the necessity of repeatedly providing the biometric information of the operator many times within a short period of time. For example, an operator may repeat an operation of pressing or releasing the enable switch during the teaching process for the robot 20 within a short period of time. Therefore, in the case where the enable switch is configured to request the determination process every time the enable switch is pressed, an operation is repeatedly interrupted every time the enable switch is pressed in order to direct his/her face to the camera, thus causing reduction of work efficiency. On the other hand, according to the embodiment, no determination process is started even when the enable switch is pressed many times until the predetermined time period elapses. Therefore, reduction of work efficiency caused by frequent execution of the determination process within a short time can be prevented.

Figure 6:
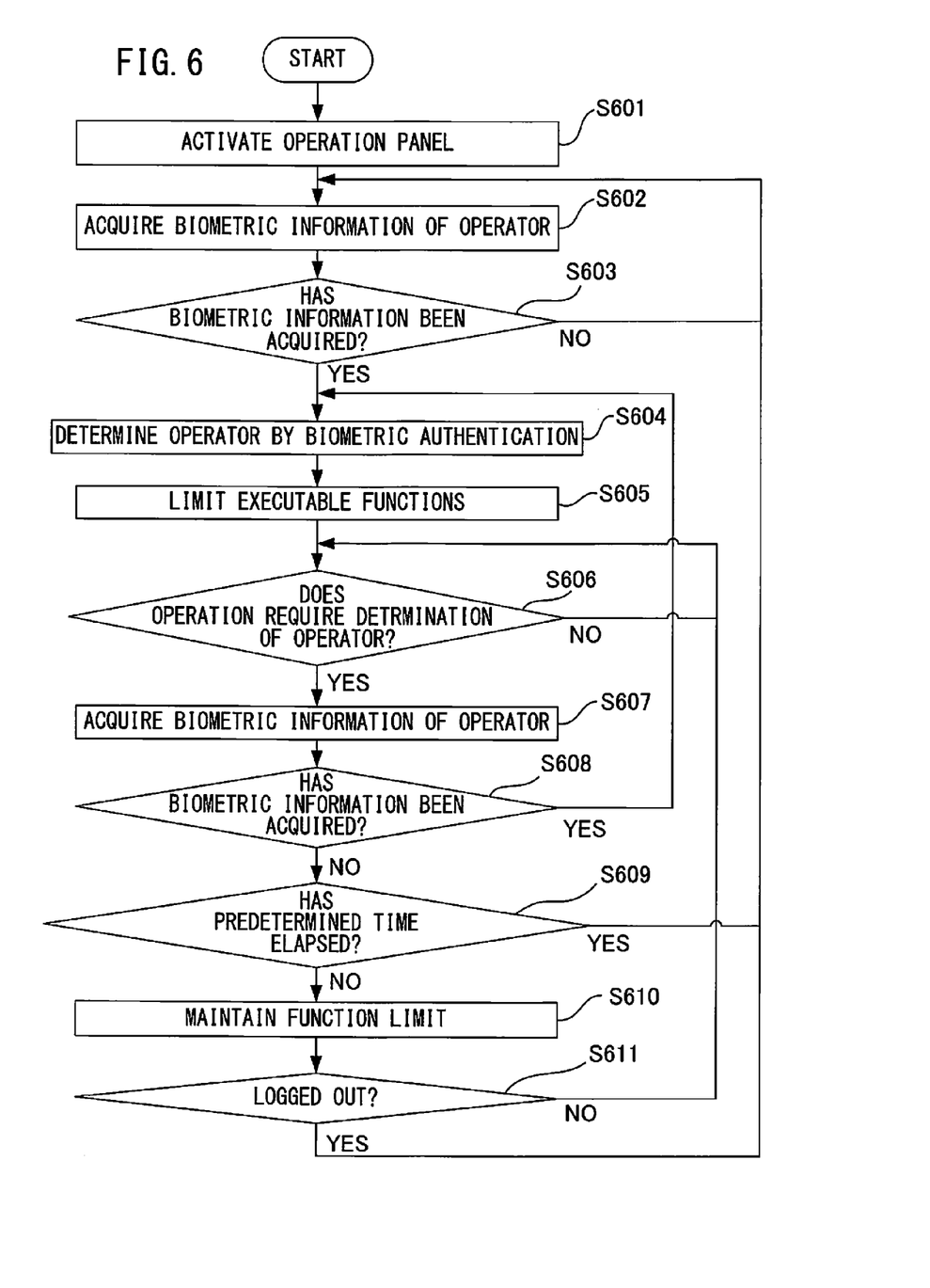
FIG. 6 is a flowchart illustrating a flow of a predetermined operation carried out by an operator using an operation panel in a robot system according to yet another embodiment.

FIG. 6 is a flowchart illustrating a flow of a certain operation carried out by an operator using an operation panel in a robot system according to yet another embodiment. According to the embodiment, until a predetermined time period elapses after execution of the last operator determination process in which the biometric information has been successfully acquired, even when acquisition of biometric information fails during the determination process, the result of the last determination process in which the biometric information has been successfully acquired is maintained, so that the limit on functions is not changed. Processes of Steps S601 to S605 are similar to those of Steps S401 to S405 illustrated in FIG. 4, and thus an explanation thereof will be omitted.

At Step S606, it is determined whether or not an operation which requires a determination process has been executed. When it is determined that the operation requiring the determination process has not been executed ("NO" at Step S606), the process does not proceed to a next Step. On the other hand, when it is determined that the operation requiring the determination process has been executed ("YES" at Step S606), the process proceeds to Step S607.

At Step S607, as in the case of Step S602, the biometric information of an operator is acquired. When it is determined that the biometric information of the operator has been acquired ("YES" at step S608), the process returns to Step S604. When it is determined that the biometric information of the operator has not been acquired ("NO" at step S608), the process proceeds to Step S609. At Step S609, it is determined whether or not a predetermined time period has elapsed after the last operator determination process in which the biometric information has been successfully acquired. When it is determined that the predetermined time has not elapsed ("NO" at step S609), the process proceeds to Step S610 where the result of the last determination process is maintained. On the other hand, when it is determined that the predetermined time has elapsed ("YES" at step S609), the processing returns to Step S602 to execute a determination process.

According to the embodiment, until the predetermined time elapses after the execution of the determination process, even when acquisition of biometric information fails, the result of the last determination process in which the biometric information has been successfully acquired is maintained. In other words, a limit on functions is not changed. Accordingly, for example, even when the operator forgets to direct his/her face to the camera and the biometric information acquisition unit 41 has failed to acquire the biometric information, the operator can continue the operation. Thus, even when acquisition of the biometric information fails during the determination process, the operator is allowed to continue the operation for a predetermined time period, reduction of work efficiency caused by frequent execution of the determination process within a short period of time can be prevented. When the biometric information is successfully acquired, a limit on functions can be imposed to the operator, and therefore safety can be ensured after the operator is switched.

According to the embodiments described above with reference to FIGS. 4 to 6, the step of determining whether or not a predetermined time period has elapsed is carried out, in view of safety or work efficiency. According to one embodiment, a length of the "predetermined time period" that is a basis for the determination is changed, depending on whether the operation panel 40 is in a valid state or an invalid state. Specifically, when the operation panel 40 is disabled, a priority should be given to work efficiency rather than safety, and therefore, the "predetermined time period" may be set long. Conversely, when the operation of the operation panel 40 is valid, a priority is given to safety, and therefore, it may be preferably that the "predetermined time period" is shortened.

Figure 7:
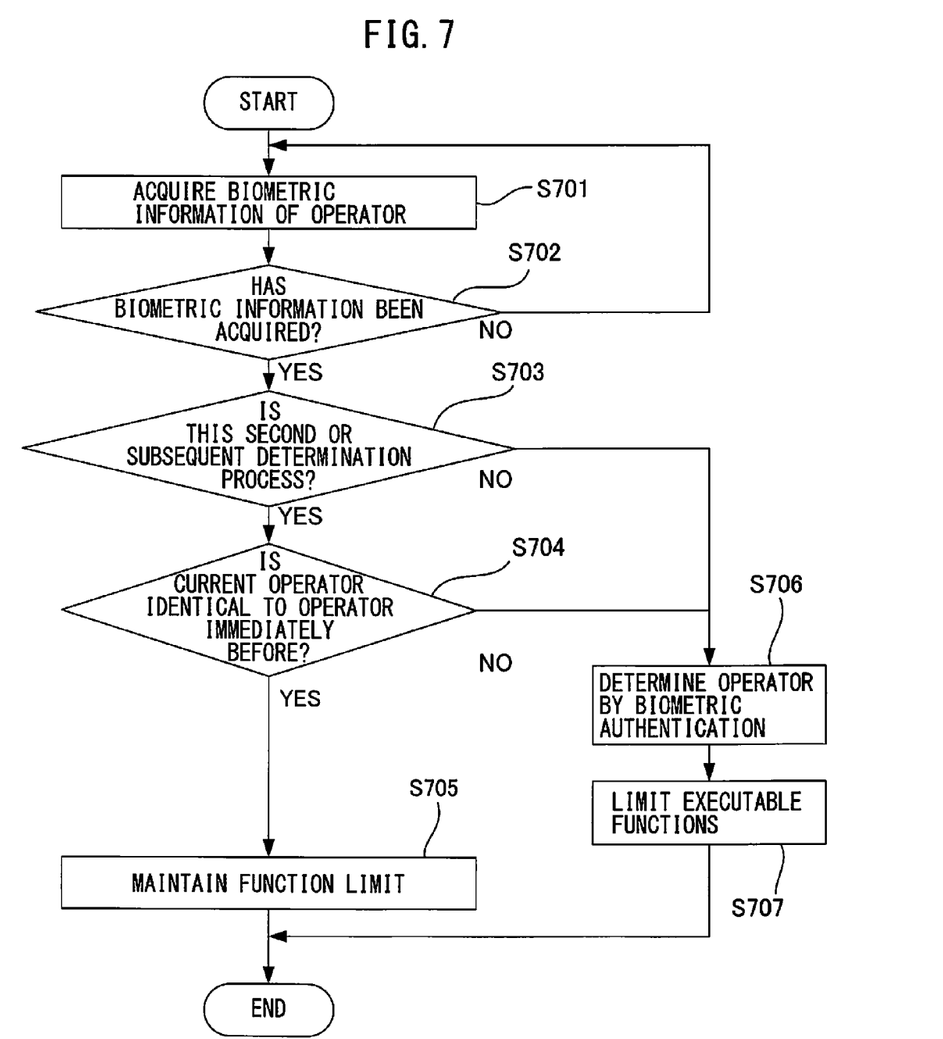
FIG. 7 is a flowchart illustrating a flow of an operator determination process in a robot system according to a modified example.

FIG. 7 is a flowchart illustrating a flow of an operator determination process in a robot system 10 according to a modified example. According to the modified example, in a second or subsequent determination process, the determination process is simplified. When the determination process is executed at the time of activation as described above, a determination process executed while an operator uses an operation panel 40 is considered as a second or subsequent determination process. When the operator is switched, a counter for recording the number of determination processes is reset to zero.

According to the modified example, when the determination process is started, at Step S701, the biometric information of the operator is acquired. At Step S702, it is determined whether or not the biometric information has been appropriately acquired.

Then, at Step S703, it is determined whether or not the determination process is a second or subsequent determination. When it is determined that the determination process is a first determination process ("NO" at Step S703), as in the case of Steps S404 and S405 described above referring to FIG. 4, the operator is determined in a normal manner, and executable functions are limited (Steps S706 and S707).

When it is determined that the determination process is a second or subsequent determination process ("YES" at Step S703), the process proceeds to Step S704 to determine whether or not the current operator is identical to the operator determined in the last determination process. The determination at Step S704 is executed by matching the acquired biometric information with that acquired in the last determination process.

When it is determined that the current operator is not identical to the operator determined in the last determination process ("NO" at Step S704), or in other words, when it is determined that the operator has been changed, the process proceeds to Step S706 to determine the operator in the normal manner. On the other hand, when it is determined that the operator has not been changed ("NO" at Step S704), the process proceeds to Step S705 to maintain a limit on functions imposed on the operator.

According to the modified example, when the identical operator continuously uses the operation panel 40, the second and subsequent determination process are executed only by confirming the sameness of the biometric information. In other words, it is unnecessary to refer to a limit on functions to be individually imposed on the operator, unlike the normal determination process. Therefore, the determination process can be completed within a short period of time, and work efficiency can be improved.

Figure 8:
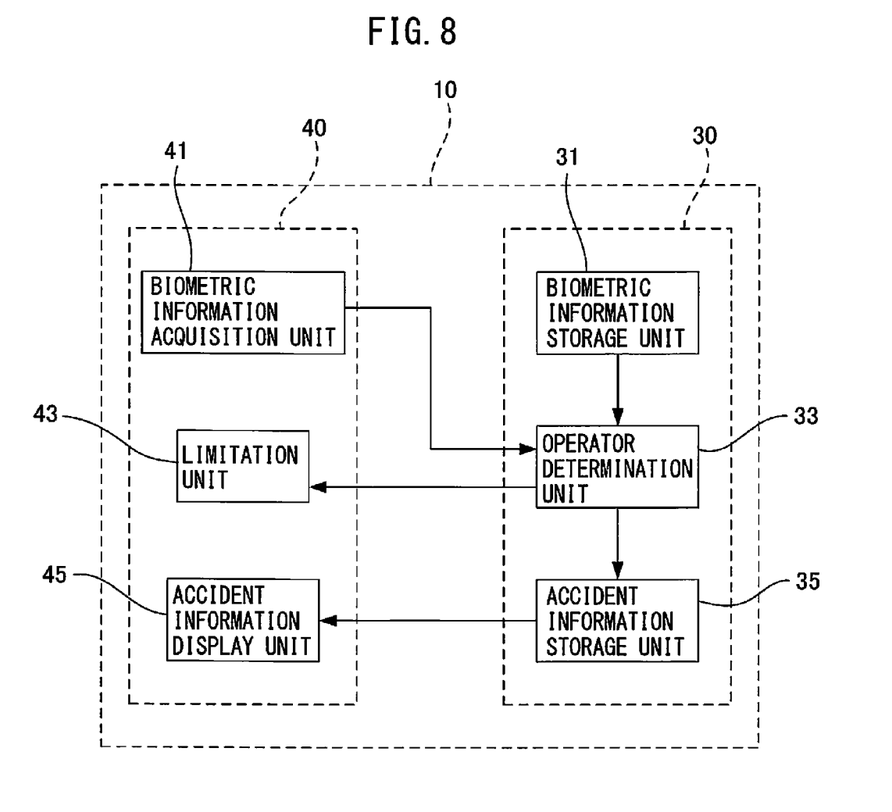
FIG. 8 is a functional block diagram illustrating a robot system according to another embodiment.

FIG. 8 is a functional block diagram illustrating a robot system 10 according to another embodiment. As can be understood in comparison with FIG. 2, according to this embodiment, the operation panel 40 further includes an accident information display unit 45, and a robot controller 30 further includes an accident information storage unit 35.

The accident information storage unit 35 has a function of storing accident information associated with each operator by the storage device 32. The accident information includes, for example, accidents that have been caused or were almost caused by the operator in the past. The accident information may include accidents tends to be caused by an operator having the same degree of skill as the operator. For example, to an operator on who a limit on some functions is imposed, only the accident information associated with executable functions may be allocated. To an operator who has been authorized only recently to carry out teaching the robot 20, the accident information relating to accidents which highly likely occur during a teaching process may be allocated. The "accident" should be construed so as to have a broad meaning, including a simple erroneous operation which does not directly cause any damage or injury.

The accident information display unit 45 displays on the display unit 44 the accident information associated with the operator determined by the operator determination unit 33. The displayed accident information serves as an alert to the operator. In place of or in addition to displaying of the accident information on the display unit 44, an alarm sound may be issued.

According to the embodiment, the accident information can be selectively notified to the operator individually or in accordance with his/her degree of skill. As a result, each operator can be effectively alerted to prevent accidents.

EFFECT OF THE INVENTION

According to the robot system having the above-described configuration, the operator is determined by using the biometric authentication in order to impose a limit on operations which can be carried out by the operator. Thus, problems, such as a terminal for determining the operator being lost or the identification information being leaked, no longer occur, and operational safety can be ensured.

Although various embodiments of the present invention have been described, as obvious to those skilled in the art, other embodiments can provide the functions and effects intended by the present invention. Particularly, constituent elements of the embodiments can be deleted or replaced and known elements can be further added, without departing from the scope of the present invention. As obvious to those skilled in the art, the present invention can be implemented by any combination of features in the plurality of embodiments explicitly or implicitly disclosed herein.

What is claimed is:

1. A robot system comprising:
a robot configured to execute an operation according to a manual operation or a control program;
a controller configured to control the robot;
a portable operation panel configured to transmit to or receive from the controller signals and data,
the operation panel comprising a biometric information acquisition unit configured to acquire biometric information of an operator who uses the operation panel, the robot system further comprising:
a biometric information storage unit configured to store biometric information of a plurality of operators;
an operator determination unit configured to determine, when the operation panel is activated or when a predetermined operation is executed for the operation panel, the operator who uses the operation panel by matching the biometric information acquired by the biometric information acquisition unit with the biometric information stored by the biometric information storage unit; and
a limitation unit configured to individually limit executable functions for the operator determined by the operator determination unit.

2. The robot system according to claim 1, wherein
the operation panel is configured to be switched between a valid state where an operation using the operation panel is validated and an invalid state where an operation using the operation panel is invalidated, and
the operator determination unit is configured not to execute an operator determination process when the operation panel is in the invalid state.

3. The robot system according to claim 1, wherein the operator determination unit is configured to request the operator determination process to be executed at every predetermined time.

4. The robot system according to claim 1, wherein the operator determination unit is configured not to execute a next operator determination process until a predetermined time period elapses after execution of the operator determination process.

5. The robot system according to claim 1, wherein until a predetermined time period elapses after execution of the operator determination process, even when acquisition of the biometric information of the operator fails in the operator determination process, a limitation on functions based on a result of a determination process which is successfully carried out immediately before is maintained.

6. The robot system according to claim 3, wherein
the operation panel is configured to be switched between a valid state where an operation using the operation panel is validated and an invalid state where an operation using the operation panel is invalidated, and
a length of the predetermined time varies depending on whether the operational panel is in the valid state or the invalid state.

7. The robot system according to claim 4, wherein
the operation panel is configured to be switched between a valid state where an operation using the operation panel is validated and an invalid state where an operation using the operation panel is invalidated, and
a length of the predetermined time varies depending on whether the operational panel is in the valid state or the invalid state.

8. The robot system according to claim 5, wherein
the operation panel is configured to be switched between a valid state where an operation using the operation panel is validated and an invalid state where an operation using the operation panel is invalidated, and
a length of the predetermined time varies depending on whether the operational panel is in the valid state or the invalid state.

9. The robot system according to claim 1, further comprising:
an accident information storage unit configured to store accident information associated with each operator; and
an accident information display unit configured to display accident information associated with the operator determined by the operator determination unit.

10. The robot system according to claim 1, wherein
the operator determination unit is configured to determine whether or not a current operator is identical to an operator immediately before based on biometric information of the operator determined immediately before and biometric information of the current operator, and
the limitation unit is configured to maintain a limit on the operator immediately before when it is determined that the current operator is identical to the operator immediately before.

11. The robot system according to claim 1, wherein the biometric information of the plurality of operators is stored in association with functions executable by each of the plurality of operators.

12. The robot system according to claim 1, wherein each function of the operation panel is stored in association with biometric information of an operator capable of executing the function.

* * * * *